United States Patent [19]
Dangel

[11] Patent Number: 5,117,709
[45] Date of Patent: Jun. 2, 1992

[54] REAR LONGITUDINAL TRANSMISSION FOR VEHICLE WITH TRANSVERSE ENGINE AND FOUR DRIVEN WHEELS

[76] Inventor: Henry Dangel, 54 Avenue de la lère D.B., 68100 Mulhouse, France

[21] Appl. No.: 369,702

[22] Filed: Jun. 21, 1989

[30] Foreign Application Priority Data

Jun. 22, 1988 [FR] France .................. 88 08392

[51] Int. Cl.$^5$ .............................................. F16H 57/02
[52] U.S. Cl. ....................................... 74/607; 180/248
[58] Field of Search .................... 74/605 G, 574, 607; 180/247, 248, 249, 250

[56] References Cited

U.S. PATENT DOCUMENTS

| | | | |
|---|---|---|---|
| 1,330,550 | 2/1920 | Richard | 74/607 X |
| 4,207,957 | 6/1980 | Sivers et al. | 74/574 X |
| 4,457,394 | 7/1984 | Suzuki | 180/248 X |
| 4,465,029 | 2/1985 | Sasaki et al. | 180/249 |
| 4,631,978 | 12/1986 | Teraoka | 180/250 X |
| 4,682,516 | 7/1987 | Okubo | 180/247 X |
| 4,867,260 | 9/1989 | Cameron et al. | 180/248 X |
| 4,874,058 | 10/1989 | Kwoka | 180/248 |
| 4,875,978 | 10/1989 | Hiketa | 180/247 X |

FOREIGN PATENT DOCUMENTS

| | | |
|---|---|---|
| 94870 | 11/1983 | European Pat. Off. . |
| 0160188 | 11/1985 | European Pat. Off. . |
| 650692 | 9/1937 | Fed. Rep. of Germany . |
| 3411746 | 5/1985 | Fed. Rep. of Germany . |
| 2509672 | 1/1983 | France . |
| 64-56235 | 3/1989 | Japan .................. 180/248 |

OTHER PUBLICATIONS

*Road and Track*, Apr. 1988, pp. 70–71.

*Primary Examiner*—Richard Lorence
*Assistant Examiner*—Benjamin Levi
*Attorney, Agent, or Firm*—Wenderoth, Lind & Ponack

[57] ABSTRACT

A rear transmission device of a vehicle with four driven wheels includes a box for transmitting power to the rear wheels, mechanically coupled to a power unit having an axis transverse to the vehicle body, a rear differential and a longitudinal linkage joining the two boxes. The box for transmitting power to the rear wheels is mounted to oscillate about a transverse axis parallel to the axis of the power unit and is joined to the housing of the rear differential by a rigid tube containing a transmission shaft. This assembly is thus integral with and articulated on the power unit. This arrangement constitutes a comparatively simple transmission device which is compact and can be fabricated at a low production cost.

5 Claims, 3 Drawing Sheets

REAR LONGITUDINAL TRANSMISSION FOR VEHICLE WITH TRANSVERSE ENGINE AND FOUR DRIVEN WHEELS

BACKGROUND OF THE INVENTION

The present invention is drawn to a rear transmission device of a vehicle having a transversely mounted engine and four driven wheels of the type comprising a box including a housing through which the drive to the rear wheels is transmitted, mechanically coupled to a power unit, a rear differential having a housing and a longitudinal transmission shaft joining the housings.

It is known that in vehicles having a transversely mounted engine and four driven wheels, the box through which power is transmitted to the rear wheels is generally integral with the power unit and oscillates with the latter. This necessitates the provision of a longitudinal transmission consisting of a broken shaft and several transmission joints with slides (universal joints).

Moreover, the length of this transmission necessitates mounting intermediate bearings fixed to the floor, so as not to exceed the authorized critical speeds.

This assembly has the following drawbacks:
significant bulk (joints, bearings),
cumbersome assembly (transmission joints and slides),
difficulty of isolating noises inside the vehicle at bearing connections,
difficulty of guaranteeing reliability over time (leak-tightness, greasing).

On the other hand, European Patent 0 160 188 discloses a transmission device in which the box for transmitting power to the rear wheels is articulated on the power unit about a transverse axis and the longitudinal tube for transmitting power to the rear is formed in articulated sections.

German Patent 650 692 discloses a transmission device provided with a rigid tube connecting the power unit and the rear axle, with which it forms a rigid assembly. As a result, the connection tube bears a part of the motor weight, and must therefore be very robust and have a large diameter in order to be able to withstand flexion forces.

SUMMARY OF THE INVENTION

The invention has as its object to provide a transmission device of the type above which is not subject to the drawbacks of the prior art.

According to the invention, a housing of the box for transmitting power to the rear wheels is connected to the rear differential housing by a rigid tube containing a power transmitting shaft, both said housings and the rigid tube forming an integral assembly articulated on said power unit about an axis parallel to the axis of said power unit.

This assembly prevents to a large extent the possible transmission of vibrations of the power unit to the vehicle interior via the bearings which are usually fixed to the floor, due to the installation of the latter in the interior of the tube joining the transmission box to the rear differential box.

Moreover, the longitudinal connection tube does not bear any portion of the motor weight, and therefore any flexion effects. This tube can be much lighter and hence have a much smaller diameter than that necessary in the transmission device disclosed in German Patent 650 692.

The power unit is advantageously mounted on elastic blocks, fixed to the chassis, while the vibration of the transmission box is absorbed by mounting the rear differential box on elastic elements integral with the chassis.

Other features and advantages of the invention will become apparent from a review of the description which follows, made with reference to the attached drawings, which illustrate one embodiment of a non-limiting example.

DETAILED DESCRIPTION OF THE PREFERRED EMBODIMENTS

Figure 1:
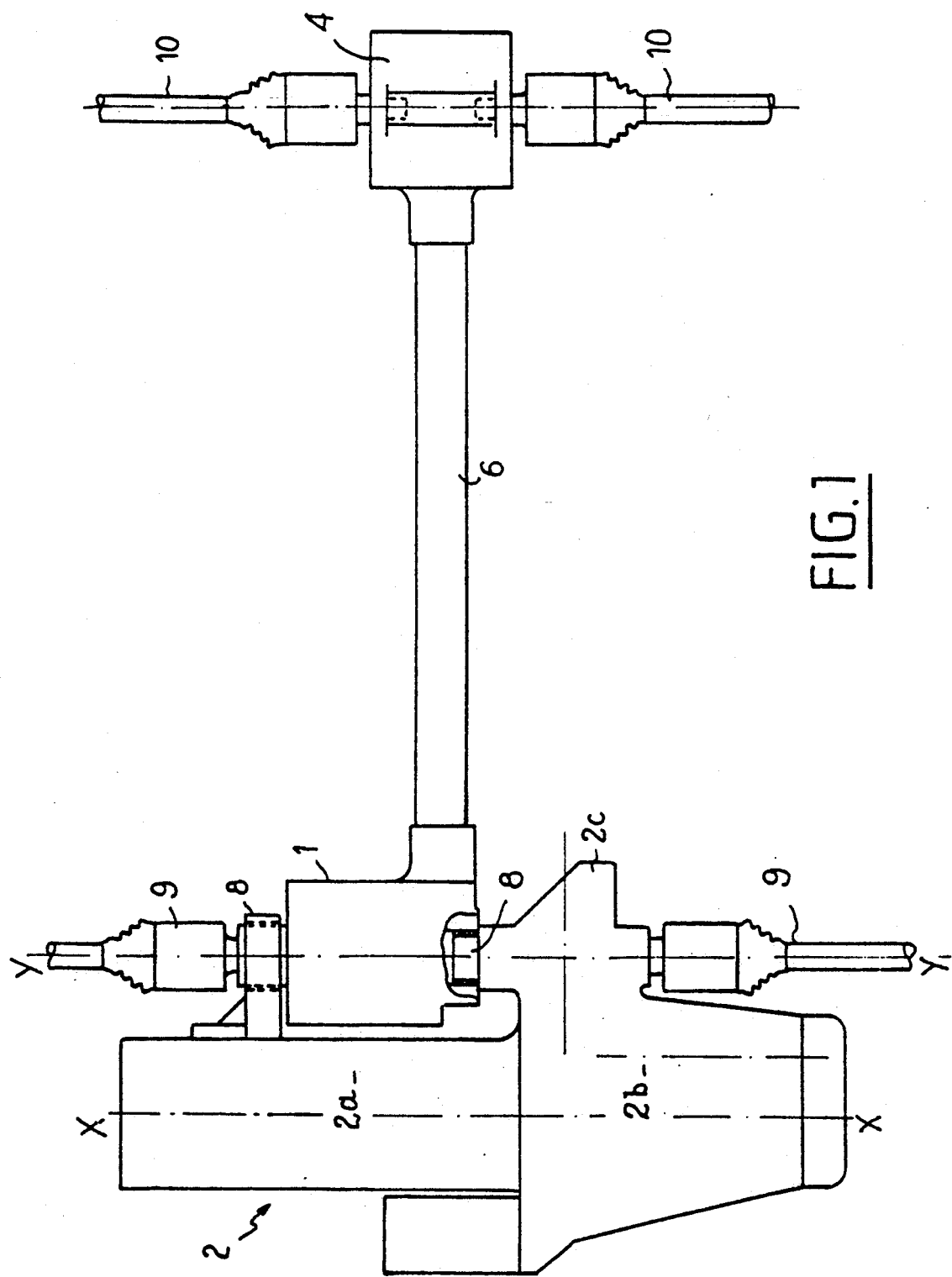
FIG. 1 is a plan view of one embodiment of the transmission device according to the invention.
Figure 2:
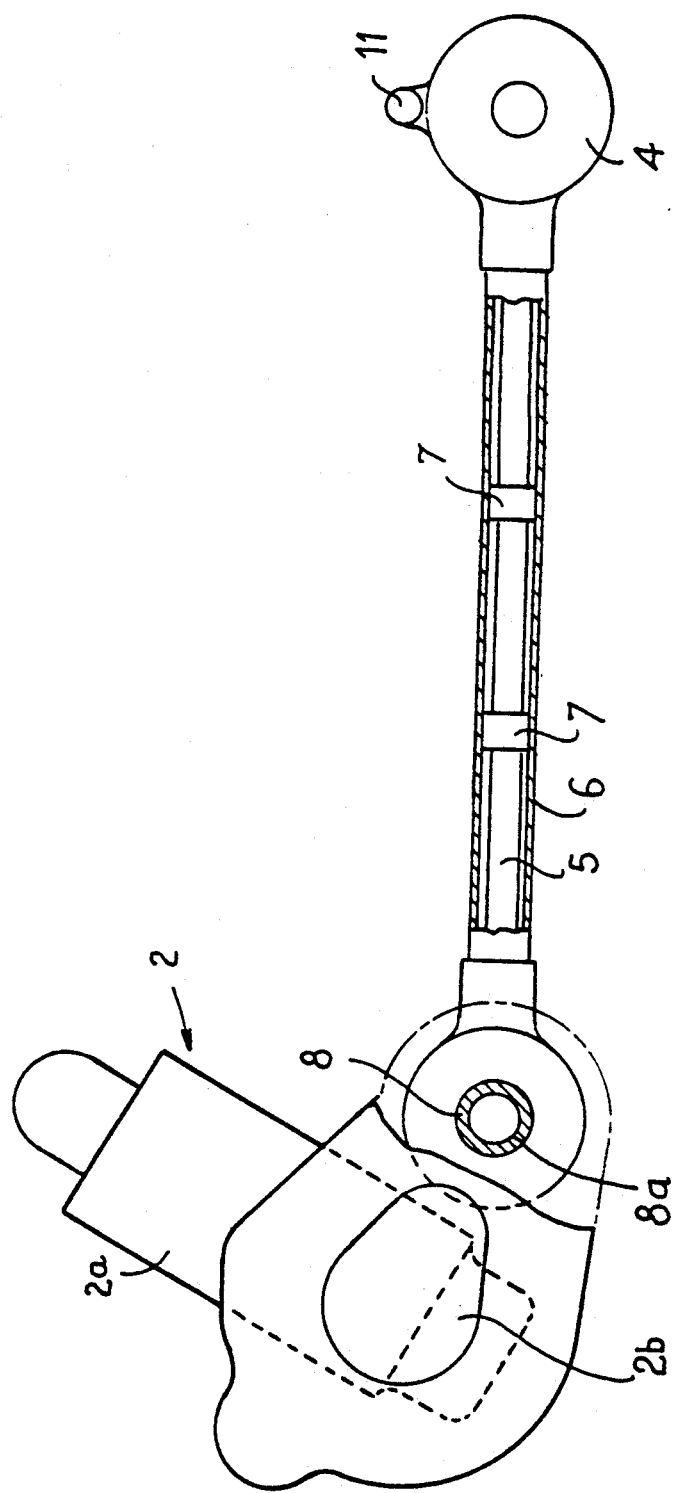
FIG. 2 is a longitudinal elevation in partial section of the transmission of FIG. 1.

The device represented in the drawings is a rear transmission device of a vehicle having four driven wheels, comprising a power transmitting box 1 for transmitting drive (power) to the rear wheels, mechanically coupled to a power unit 2 having transverse axis XX by way of a front differential 2c of said power unit 2. The power unit 2 further includes the engine 2a and a gearbox 2b.

The box 1 may contain a transmission device, or even in addition to this an interaxle differential distributing the drive between the two axles, the front and rear.

This power transmitting box 1 is mounted to oscillate about a transverse axis Y—Y which is parallel to the axis X—X of the power unit 2, and which is defined by support bearings 8 integral with the unit 2. Advantageously, the bearings 8 are lined with an anti-friction material 8a which prevents seizures during very small movements of the unit 2 and the box 1. On both sides of the front differential 2c and the power transmitting box 1 are front transmission systems 9 for the front wheels (not shown). On both sides of the rear differential 4 are rear transmission systems 10 for the rear wheels.

The transmission device also comprises a power transmission shaft 5 joining the transmission box 1 to the rear differential 4, as well as a rigid linking tube 6 integral with the housing of said box 1 and rear differential 4 and which contains the transmission shaft 5. The latter rests on small bearings 7 inside the tube 6.

The two housings, namely the housing of the power transmitting box 1 and of the rear differential 4 as well as the linking tube 6 form an integral assembly articulated to the unit 2 about the axis Y—Y.

The power unit 2 is mounted on elastic blocks (which are not shown) fixed to the chassis, and similarly the box 4 is suspended on the chassis by an elastic device 11 which permits the absorption of the vibration of the integral assembly in the vertical direction and in the longitudinal direction. (In practice, the maximum amplitude at the bearings 8 in the longitudinal direction may, for example, be 12 mm, or 15 mm in the vertical direction.)

Figure 3:
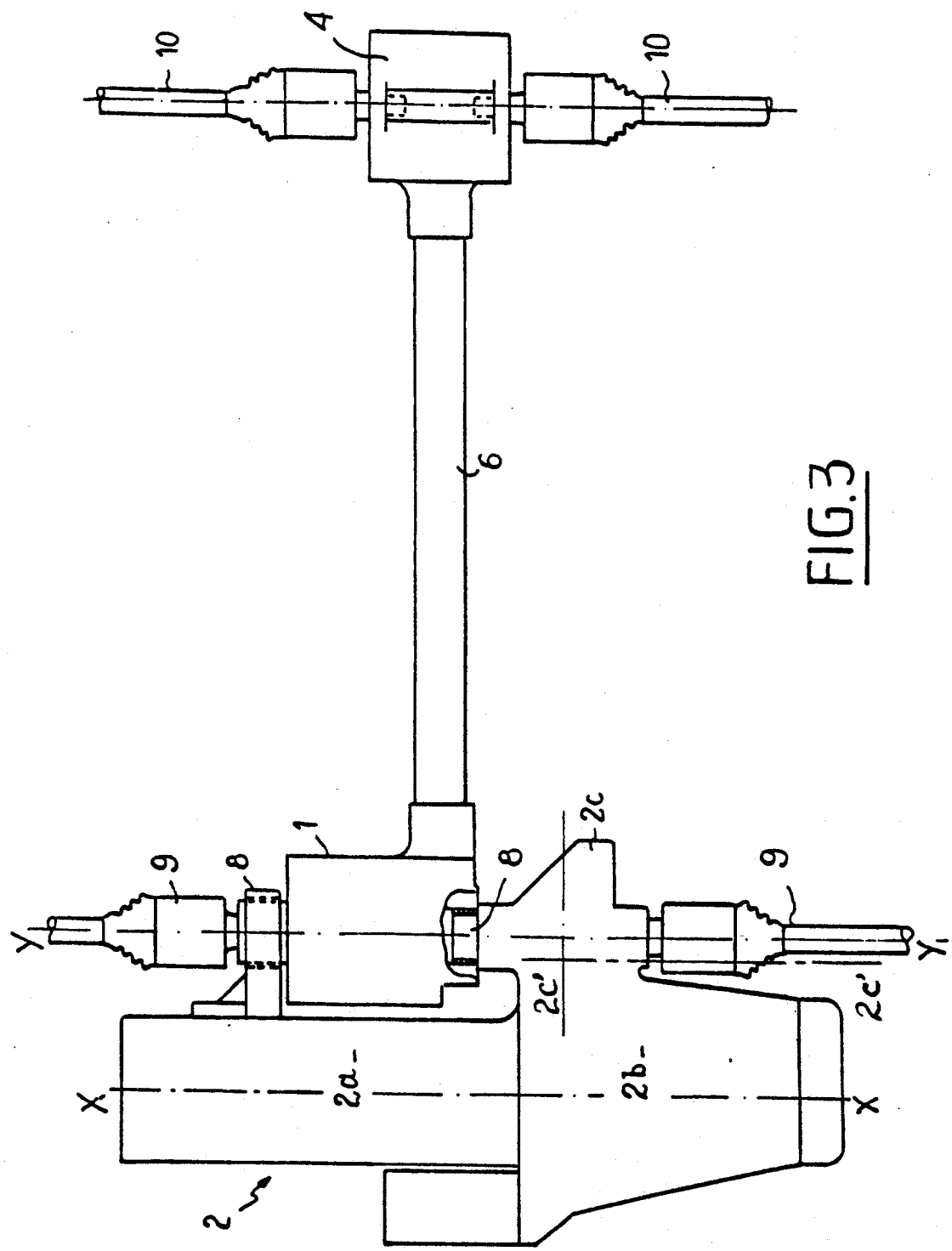
FIG. 3 is a plan view of another embodiment of the present invention.

The articulation axis Y—Y of the transmission box 1 on the power unit 2 is not necessarily coincident with the axis of the front differential 2c as shown in FIG. 1, but may be offset and parallel with the axis 2c'—2c' of the front differential as shown in FIG. 3.

Also, alternatively, the linking tube 6 is not necessarily positioned in the central plane of the vehicle, but may be offset in a plane parallel to the latter.

The essential advantage of the articulation of the transmission box 1 on the axis Y—Y parallel to the axis X—X of the power unit 2 consists in the fact that it permits the replacement of the complex, fragile, bulky and possibly noisy earlier systems with a simplified integral system, of noticeably reduced bulk, lower cost and greater reliability. This integral assembly comprises, as already indicated, the housing of the front box 1, the housing of the rear differential 4 and the rigid tube 6.

The transmission joints and slides previously needed for the broken shaft are done away with thanks to the single shaft 5, which may be housed in the rigid tube 6, which diminishes the level of noise in the vehicle interior due to the fact that there is no connection with the floor.

I claim:

1. In a vehicle having four driven wheels, a rear differential to which two rear ones of the wheels are connected, the rear differential having a rear differential housing, and a power unit mounted transversely of the vehicle so as to define an axis transverse to the vehicle, a rear transmission device comprising:

a power transmitting box mechanically coupled to the power unit at a front portion of the vehicle for transmitting power from the power unit toward the rear wheels of the vehicle, said power transmitting box having a housing;

a rigid tube extending longitudinally of the vehicle between and fixed to the housing of the power transmitting box and the rear differential housing; and a power transmission shaft extending through said rigid tube and mechanically coupled with said power transmitting box and the rear differential, the housing of said power transmitting box, said rear differential housing and said rigid tube constituting an integral assembly articulated on the power unit about an axis parallel to said axis transverse to the vehicle.

2. A rear transmission device in a vehicle as claimed in claim 1, wherein support bearings are integral with the power unit, and said power transmitting box is rotatably supported by said bearings, said integral assembly being articulated on the power unit via said support bearings.

3. A rear transmission device in a vehicle as claimed in claim 1, wherein the power unit includes a front differential defining an axis, said axis about which said integral assembly is articulated being offset and parallel to the axis defined by the front differential.

4. A rear transmission device in a vehicle as claimed in claim 2, wherein anti-friction material lines said support bearings.

5. A rear transmission device in a vehicle as claimed in claim 1, further comprising bearings disposed within said rigid tube and rotatably supporting said power transmission shaft.

* * * * *